July 8, 1924.
B. H. HOWARD ET AL
FEEDER FOR INGOT MOLDS
Filed Feb. 15, 1924
1,500,758
2 Sheets-Sheet 1
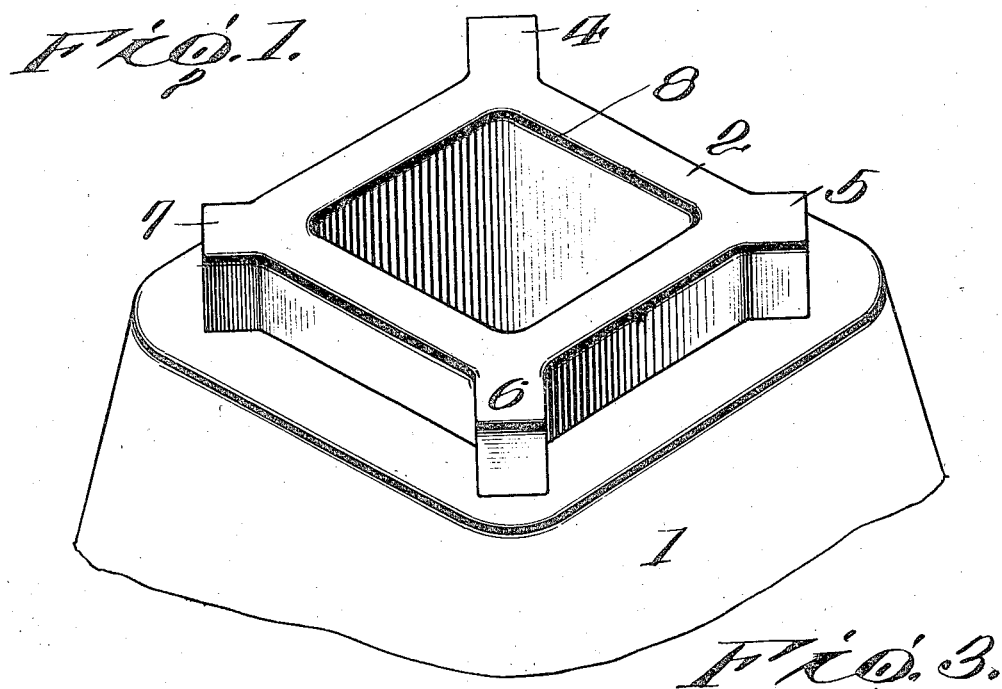
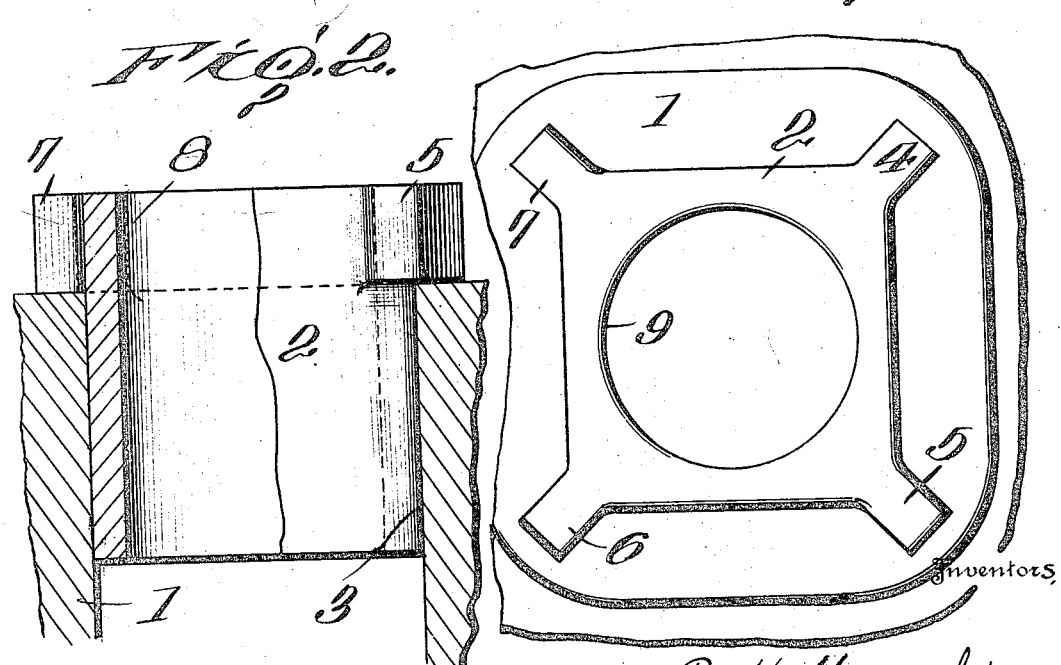

July 8, 1924.
B. H. HOWARD ET AL
FEEDER FOR INGOT MOLDS
Filed Feb. 15, 1924
1,500,758
2 Sheets-Sheet 2

Inventors
B. H. Howard.
E. J. Turner.
By C. R. Wright, Jr.
Attorney

Patented July 8, 1924.

1,500,758

UNITED STATES PATENT OFFICE.

BLOOMFIELD H. HOWARD, OF WASHINGTON, DISTRICT OF COLUMBIA, AND ERNEST J. TURNER, OF PITTSBURGH, PENNSYLVANIA.

FEEDER FOR INGOT MOLDS.

Application filed February 15, 1924. Serial No. 693,099.

*To all whom it may concern:*

Be it known that BLOOMFIELD H. HOWARD and ERNEST J. TURNER, citizens of the United States, residing, respectively, at Washington, District of Columbia, and Pittsburgh, in the county of Allegheny and State of Pennsylvania, have invented certain new and useful Improvements in Feeders for Ingot Molds, of which the following is a specification.

Our invention relates to improvements in feeders for ingot molds.

The object of our invention is to provide a feeder for ingot molds used in the manufacture of iron or steel ingots which will prevent the formation of holes and seams at the upper end of the ingot known as "piping" and at the same time produce a feeder which will reduce segregation to a minimum.

Another object of our invention is to provide a feeder having supporting means at its upper end so arranged that the feeder is supported by the upper end of the mold and at the same time strengthening that portion of the feeder subjected to the greatest strain.

A further object of our invention is to provide a feeder of this character which can be extended a greater or less distance into the mold whereby an ingot of a greater or less length can be cast in the mold.

A still further object of our invention is to provide a simple, cheap and effective feeder of this character having certain details of structure and combination of parts hereinafter more fully set forth.

In the accompanying drawings:—

Figure 1 is a perspective view of a mold showing our improved feeder applied thereto.

Figure 2 is a vertical transverse sectional view of Figure 1.

Figure 3 is a top plan view of Figure 1 showing the bore of the feeder of a circular form.

Figure 4:
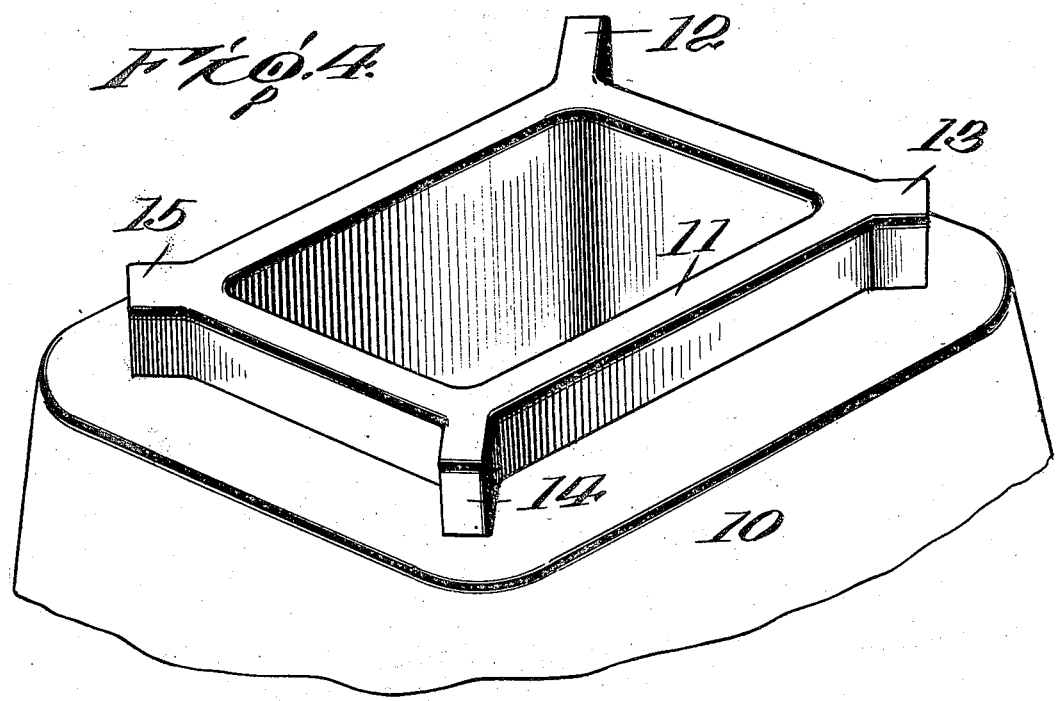
Figure 4 is a perspective view of an ingot mold showing a rectangular feeder applied to a correspondingly shaped mold.

Referring now to the drawings 1 represents the mold and 2 the feeder. The feeder as shown and as is well understood in the art is made of refractory material and has its outer periphery adapted to closely fit the bore 3 of the mold as shown in Figures 1 and 2 of the drawings. The feeder 1 is provided at its four corners with outwardly extending radially arranged ribs 4, 5, 6 and 7 which are rectangular in shape and support the feeder any desired distance above the corners of the mold. While we have shown these ribs extending but a short distance above the corners of the mold it will be understood that they could extend a greater or less distance to allow the feeder to extend a greater or less distance into the bore of the mold. The ribs 4, 5, 6 and 7 can be made to extend a greater distance from the wall of the feeder so as to allow the feeder to be supported upon molds of greater diameter.

In the form shown in Figures 1 and 2 we have shown a rectangular feeder and a correspondingly shaped bore 8 extending through the feeder.

In Figure 3 we have shown the same form of feeder as that shown in Figures 1 and 2 and like reference numerals indicate like parts. In this form however, the bore 9 is of a circular form.

In the modification shown in Figure 4 of the drawings we have shown a rectangular mold 10 and a correspondingly shaped feeder 11 entering the bore of the mold and provided at its four corners with the radially arranged ribs 12, 13, 14 and 15. These ribs as shown are rectangular in form and of a width less than that shown in Figures 1 and 2.

Figure 5:
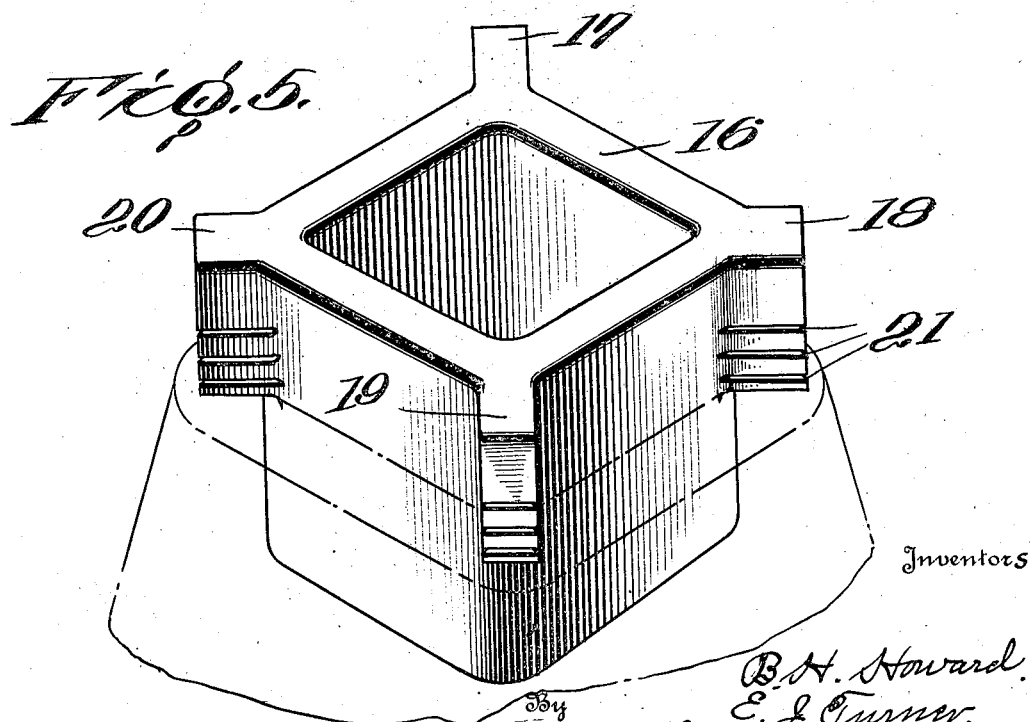
Figure 5 is a perspective view of a feeder showing a modified form of rib adapted to be broken off to allow the same to enter the mold a greater distance.

In the modification shown in Figure 5 we have shown a rectangular shaped feeder 16 which is provided like the form shown in Figures 1 and 2 at each corner with the radially extending ribs 17, 18, 19 and 20 rectangular in shape and extending any desired distance outwardly from the corners of the mold. In this form we have shown the ribs extending downwardly a greater distance along the side of the feeder and adjacent their lower ends are provided with a series of scores or slots 21 arranged different distances apart and whereby a portion or portions of the ribs between the scores or slots can be broken off to allow the feeder to enter a greater distance into the bore of the mold. While we have shown and described the ribs as being rectangular it will be understood that the form of the same could be varied without departing from our invention.

Having thus fully described our invention what we claim is:—

1. A hot top feeder for ingot molds comprising a portion having vertically disposed ribs at the corners and transversally scored.

2. A hot top feeder for ingot molds comprising a body portion having vertically disposed ribs at the corners and having horizontal scores below the upper end whereby a portion of the ribs may be broken off to allow the feeder to enter a greater distance into the mold.

3. A hot top feeder for ingot molds comprising radially arranged ribs carried by the four corners and having horizontal scores whereby a portion of the ribs can be broken off.

4. A hot top feeder for ingot molds comprising a body portion having radially arranged ribs carried by the four corners and constructed so that a portion can be broken off.

In testimony whereof we affix our signatures.

BLOOMFIELD H. HOWARD.
ERNEST J. TURNER.